(12) United States Patent
Fujii

(10) Patent No.: US 7,732,717 B2
(45) Date of Patent: Jun. 8, 2010

(54) COMBINATION WEIGHING APPARATUS WITH DISPERSION UNIT FOR DISPERSING ARTICLES

(75) Inventor: Masaya Fujii, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 110 days.

(21) Appl. No.: 12/064,404

(22) PCT Filed: Sep. 21, 2006

(86) PCT No.: PCT/JP2006/318710

§ 371 (c)(1),
(2), (4) Date: Feb. 21, 2008

(87) PCT Pub. No.: WO2007/034859

PCT Pub. Date: Mar. 29, 2007

(65) Prior Publication Data

US 2009/0260896 A1   Oct. 22, 2009

(30) Foreign Application Priority Data

Sep. 21, 2005   (JP)   ............... 2005-273289

(51) Int. Cl.
*G01G 19/387* (2006.01)
*G01G 13/06* (2006.01)
*B65G 47/00* (2006.01)

(52) U.S. Cl. ............ 177/25.18; 222/482; 198/359; 198/533

(58) Field of Classification Search ............. 177/25.18; 198/359–361, 533; 222/482
See application file for complete search history.

(56) References Cited

U.S. PATENT DOCUMENTS

| | | | | |
|---|---|---|---|---|
| 4,272,028 A | * | 6/1981 | Cobb | 239/687 |
| 4,487,338 A | * | 12/1984 | Oshima et al. | 222/196 |
| 4,552,236 A | * | 11/1985 | Mikami | 177/25.18 |
| 4,600,096 A | * | 7/1986 | Yamano et al. | 198/533 |
| 4,607,713 A | * | 8/1986 | Nishi et al. | 177/25.18 |
| 4,941,565 A | * | 7/1990 | Hirota et al. | 198/601 |
| 5,074,436 A | | 12/1991 | Inoue | |
| 2009/0260896 A1 | * | 10/2009 | Fujii | 177/25.18 |
| 2009/0277692 A1 | * | 11/2009 | Tatsuoka et al. | 177/25.18 |

FOREIGN PATENT DOCUMENTS

JP   2754048 B   3/1998
JP   2001-183224 A   7/2001

* cited by examiner

*Primary Examiner*—Randy W Gibson
(74) *Attorney, Agent, or Firm*—Global IP Counselors, LLP

(57) ABSTRACT

A combination weighing apparatus includes a dispersion unit, a plurality of weighing hoppers, and a combination unit. The dispersion unit circumferentially disperses articles that drop from above. The weighing hoppers are arranged generally circumferentially below the dispersion unit. The combination unit combines weight results obtained from each of the weighing hoppers. In addition, a state of a drop position of the articles in the dispersion unit changes during operation.

7 Claims, 4 Drawing Sheets

(a)

(b)

(c)

(d)

though the drop position of the articles on the dispersion table is deviated from the rotational center axis.
COMBINATION WEIGHING APPARATUS WITH DISPERSION UNIT FOR DISPERSING ARTICLES

CROSS-REFERENCE TO RELATED APPLICATIONS

This application is a U.S. National Phase application of the international application No. PCT/JP2006/318710 filed on Sep. 21, 2006, which claims priority to Japanese Patent Application No. 2005-273289 filed on Sep. 21, 2005. The entire disclosure of Japanese Patent Application No. 2005-273289 is hereby incorporated herein by reference

TECHNICAL FIELD

The present invention relates to a combination weighing apparatus. More specifically, the present invention relates to a combination weighing apparatus having a dispersion unit.

BACKGROUND ART

Typically, a combination weighing apparatus comprises a dispersion table and a plurality of weighing hoppers. Articles supplied to the dispersion table are dispersed on the dispersion table and supplied to each of the weighing hoppers. A cleat conveyor, a bucket conveyor, or the like is used to supply the articles to the dispersion table.

Here, to disperse the articles supplied to the dispersion table from the conveyor by oscillating the dispersion table is difficult in a case, for example, when the articles are soft articles such as poultry meat and the like. Therefore, a method in which articles are dropped onto a rotary dispersion table is often employed. However, it is difficult to drop the articles from the conveyor onto a generally central portion of the dispersion table when the articles are soft and highly adhesive articles such as poultry meat and the like. Therefore, in such a case, a drop position of the articles may be deviated from the central portion, causing the articles to be unevenly supplied to the weighing hoppers.

For this reason, with an apparatus described in Japanese Laid-Open Patent Application Publication No. 2001-183224, projections are provided on the dispersion table configured to rotate in one direction in order to prevent uneven feeding of articles to the weighing hoppers disposed below the dispersion table.

DISCLOSURE OF THE INVENTION

However, in reality, the projections alone as described in the above-mentioned reference cannot prevent an uneven supply of the articles. In addition, there are times when the articles that slide down in a radial direction by a centrifugal force generated through rotation of the dispersion table are caught by the projections.

It is therefore an object of the present invention to provide a combination weighing apparatus comprising a dispersion unit capable of controlling a bias of directions in which articles slide down.

A combination weighing apparatus according to a first aspect of the present invention includes a dispersion unit, a plurality of weighing hoppers, and a combination unit. The dispersion unit is configured to circumferentially disperse articles which drop onto the dispersion unit from above. The weighing hoppers are arranged generally circumferentially below the dispersion unit to weigh the articles discharged into the weighing hoppers. The combination unit is configured to combine weight results obtained from the weighing hoppers. During operation, a state of a drop position of the articles in the dispersion unit changes. More specifically, the dispersion unit includes a generally cone shaped dispersion table and a rotary drive unit configured to rotate the dispersion table about a rotational center axis with an apex of the dispersion table being offset from the rotation center axis.

A combination weighing apparatus according to a second aspect of the present invention includes a dispersion unit, a plurality of weighing hoppers, and a combination unit. The dispersion unit is configured to circumferentially disperse articles which drop onto the dispersion unit from above. The weighing hoppers are arranged generally circumferentially below the dispersion unit to weigh the articles discharged into the weighing hoppers. The combination unit is configured to combine weight results obtained from the weighing hoppers. The dispersion unit includes a dispersion table and a rotary drive unit configured to rotate the dispersion table about a rotational center axis. The rotary drive unit is configured to change a rotation pattern of the dispersion table.

A combination weighing apparatus according to a third aspect of the present invention includes a dispersion unit, a plurality of weighing hoppers, and a combination unit. The dispersion unit is configured to circumferentially disperse articles which drop onto the dispersion unit from above. The weighing hoppers are arranged generally circumferentially below the dispersion unit to weigh the articles discharged into the weighing hoppers. The combination unit is configured to combine weight results obtained from the weighing hoppers. The dispersion unit includes a dispersion table and a rotary drive unit configured to rotate the dispersion table about a rotational center axis. The dispersion table is inclined with respect to a horizontal direction during the period when the dispersion table is rotatably driven by the rotary drive unit.

A combination weighing apparatus according to a fourth aspect of the present invention comprises a dispersion unit, a plurality of weighing hoppers, and a combination unit. The dispersion unit is configured to receive articles and to circumferentially disperse the same. The weighing hoppers are configured to receive the articles dispersed by the dispersion unit and to weigh the same. The combination unit is configured to combine weight results obtained from the weighing hoppers so that a predetermined weight or a predetermined quantity is reached. In addition, a state of the predetermined position in the dispersion unit changes during operation. More specifically, the dispersion unit includes a generally cone shaped dispersion table and a rotary drive unit configured to rotate the dispersion table about a rotational center axis with an apex of the dispersion table being offset from the rotation center axis.

According to the combination weighing apparatus of the present invention, a state of a supply position of the articles in the dispersion unit changes during operation, and therefore a bias of directions in which the articles slide down is controlled and the directions in which the articles slide down are more evenly dispersed.

In particular, according to the combination weighing apparatus of the first and the fourth aspect of the present invention, the directions in which the articles slide down are dispersed by rotation of an inclined surface of a generally cone shaped dispersion table whose apex is offset from the rotational center axis. Accordingly, the articles can be appropriately dispersed even when the drop position of the articles on the dispersion table is deviated from the rotational center axis.

BEST MODE FOR CARRYING OUT THE INVENTION

A combination weighing apparatus 1 according to a preferred embodiment of the present invention is described below with reference to accompanying drawings.

Overall Structure

First, general functions and operations of the combination weighing apparatus 1 are described.

Figure 1:
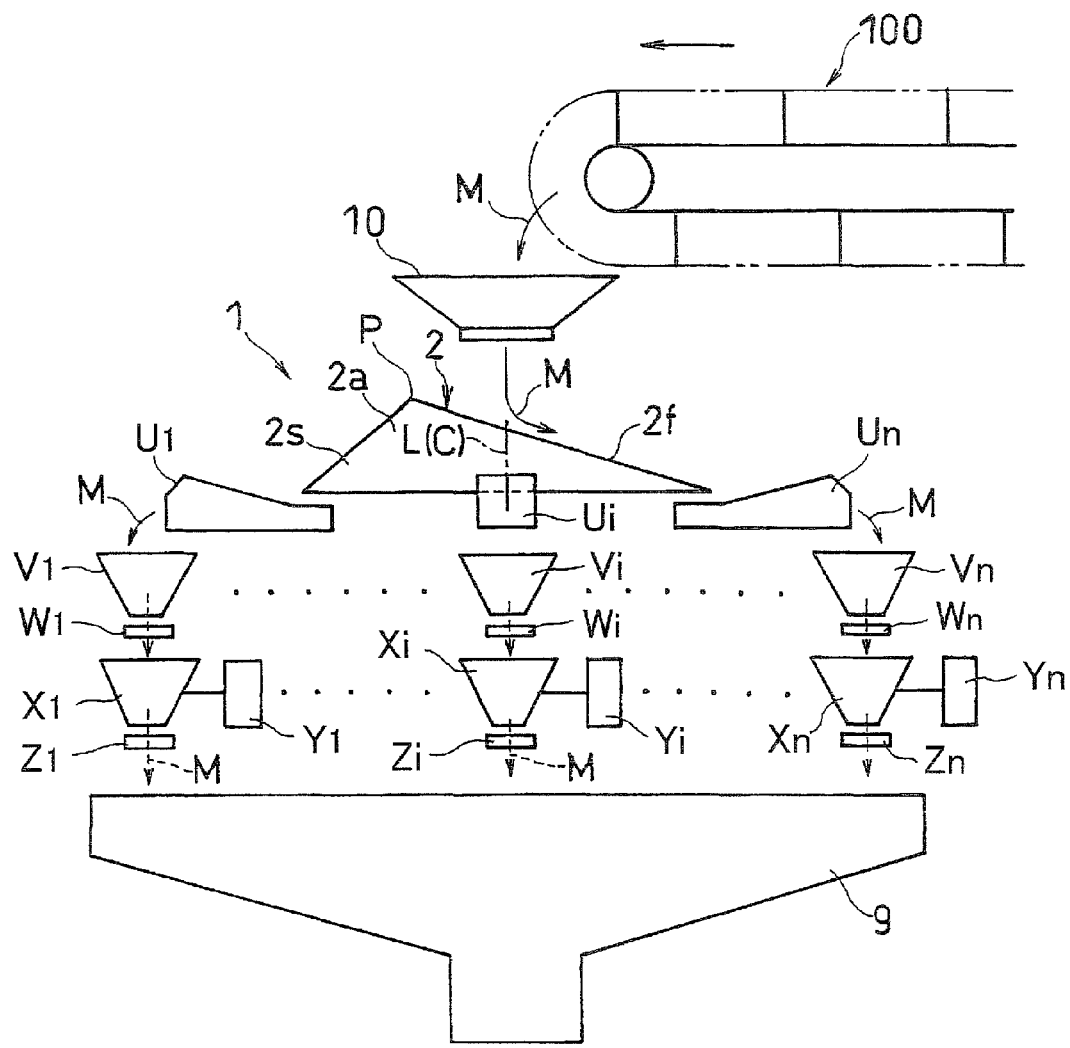
FIG. 1 is a schematic diagram of a combination weighing apparatus according to an embodiment of the present invention.

As shown in FIG. 1, a transportation conveyor 100 transports articles M to be weighed to a position above a dispersion unit 2 of the combination weighing apparatus 1, and drops the articles M to the dispersion unit 2 of the combination weighing apparatus 1. The combination weighing apparatus 1 collects a plurality of articles M so that the total quantity or the total weight of the articles M is equal to or close to a predetermined quantity or weight. Then, the articles M collected by the combination weighing apparatus 1 are packaged into products by a bag manufacturing and packaging apparatus and the like (not shown) disposed downstream of the combination weighing apparatus 1.

Figure 2:
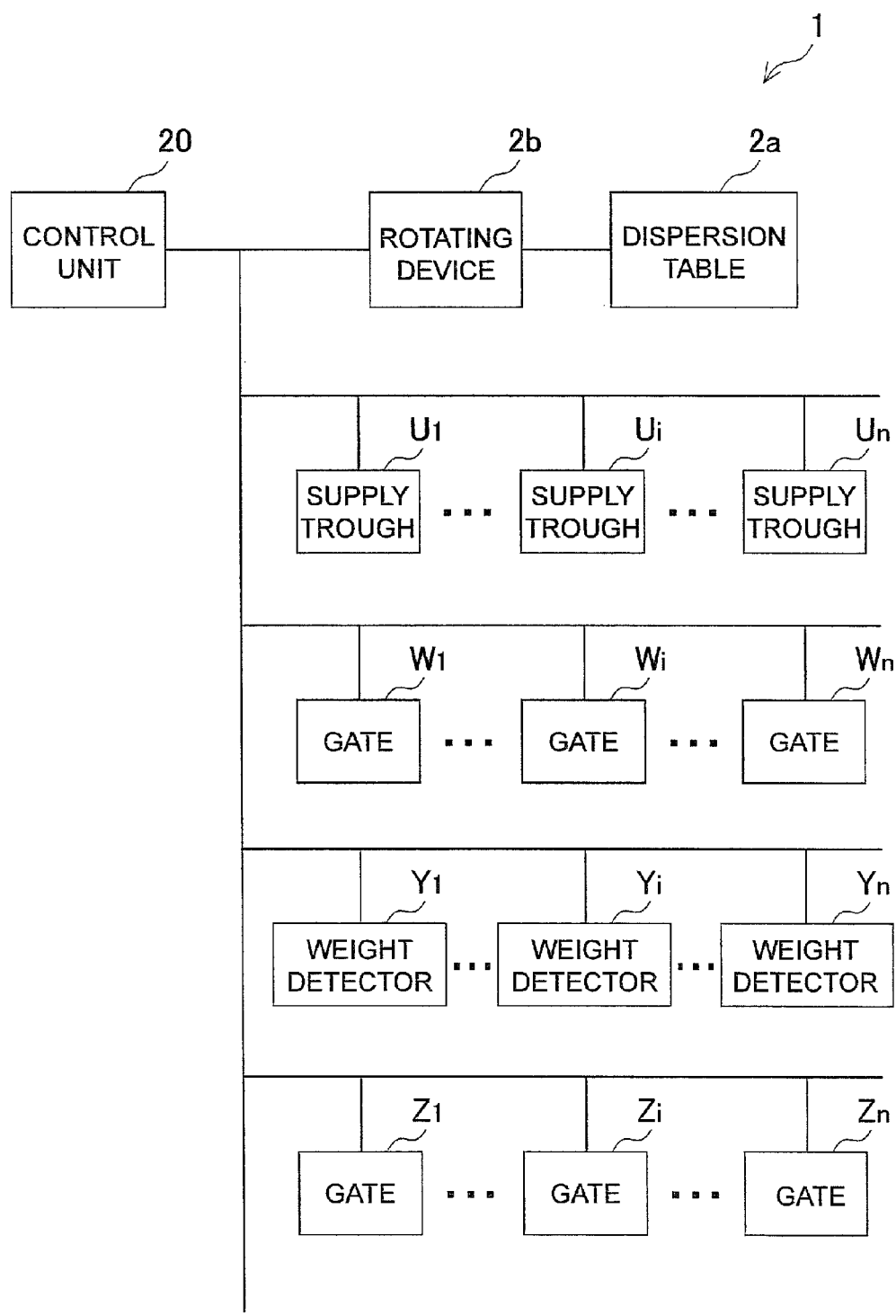
FIG. 2 is a block diagram of the combination weighing apparatus according to the embodiment of the present invention.

The combination weighing apparatus 1 includes a chute 10, the dispersion unit 2, n number of supply troughs Ui (i=1, 2, - - - , n), n number of pool hoppers Vi (i=1, 2, - - - , n), n number of weighing hoppers Xi (i=1, 2, - - - , n), a collection discharge chute 9, and a control unit 20 (combination unit) (see FIG. 2).

Each supply trough Ui supplies the articles M received from the dispersion unit 2 to the pool hopper Vi disposed downstream of the relevant supply trough Ui. Each pool hopper Vi is provided with a gate Wi (i=1, 2, - - - , n), and temporarily stores and accumulates the received articles M supplied from the supply trough Ui. Each weighing hopper Xi is disposed downstream of the pool hopper Vi. Each weighing hopper Xi is provided with a gate Zi (i=1, 2, - - - , n) and a weighing head equipped with a weight detector Yi (i=1, 2, - - -, n) configured to detect the weight of the articles M fed from the pool hopper Vi to the relevant weighing hopper Xi. The large collection discharge chute 9 is provided below the gates Z1 to Zn. The control unit 20 combines weight results of the articles M detected by each weight detector Yi so that a target weight or a weight close to the target weight is reached. The collection discharge chute 9 collects the articles M in a batch which correspond to the weight results selected by the control unit 20 by carrying out the combination process, and drops the collected articles M to a bag manufacturing and packaging apparatus (not shown) disposed downstream of the collection discharge chute 9.

Dispersion Unit 2

FIGS. 3(a) to 3(d) are schematic plan views of the dispersion unit 2 and the supply troughs U1 to Un, and FIGS. 3(e) to 3(h) are schematic lateral views in the vicinity of the dispersion unit 2 and the supply troughs U1 to Un. Note that FIG. 3(e) corresponds to FIG. 3(a), FIG. 3(f) to FIG. 3(b), FIG. 3(g) to FIG. 3(c), and FIG. 3(h) to FIG. 3(d).

Figure 3:
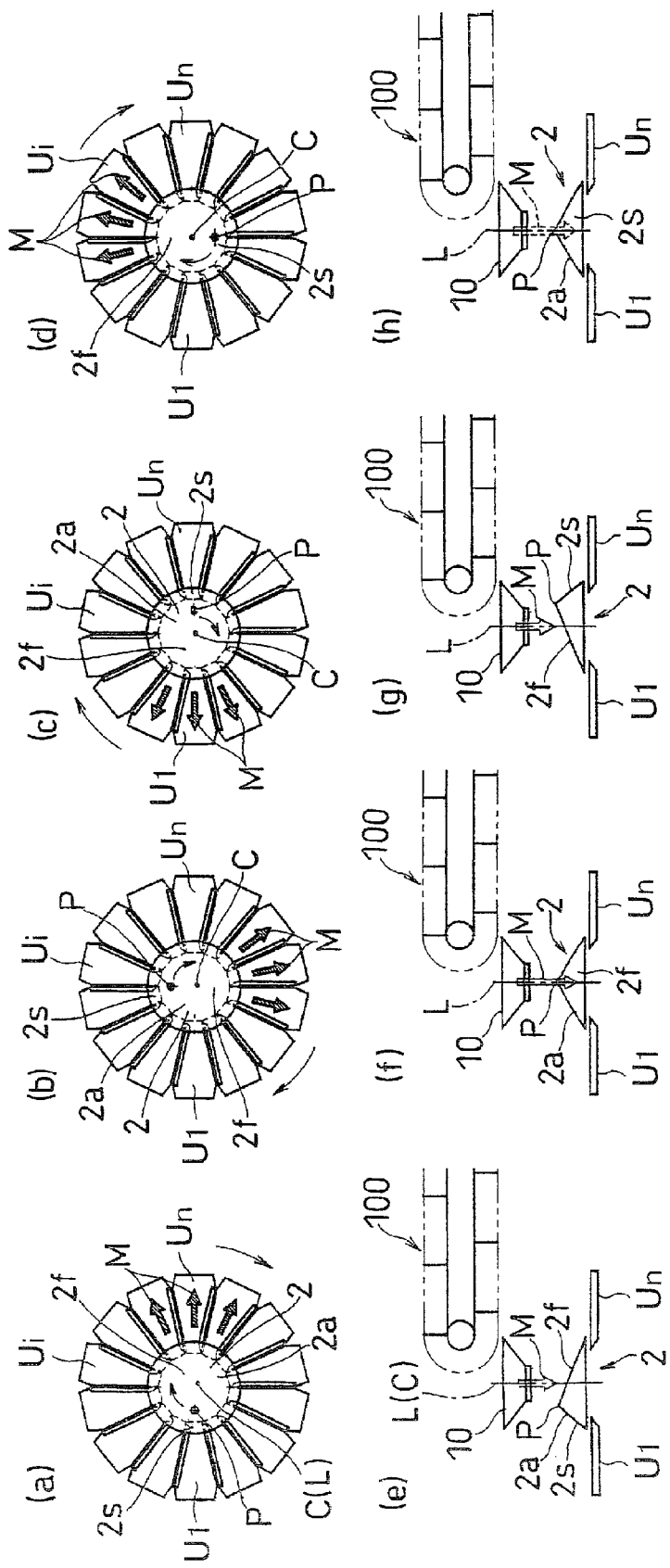
FIG. 3 includes a plurality of diagrams (a) to (d) illustrating schematic plan views of a dispersion table and a plurality of supply troughs of the combination weighing apparatus and a plurality of diagrams (e) to (h) illustrating schematic lateral views of the dispersion table and the supply troughs, the diagrams (a) to (h) showing a method in which articles are supplied from the dispersion table to the supply troughs according to the embodiment of the present invention.

As shown in FIG. 1 and FIG. 3(e), the dispersion unit 2 comprises a generally cone shaped dispersion table 2a whose apex P is eccentric, and a rotating device 2b configured to rotatably drive the dispersion table 2a. Since the apex P of the generally cone shaped dispersion table 2a is eccentric (i.e., the dispersion table 2a generally has a shape of an oblique cone), the dispersion table 2a has an inclined surface 2f on the side of the longer generating line (generatrix) and an inclined surface 2s on the side of the shorter generating line. The rotation center C shown in FIG. 3(a) is located on the inclined surface 2f on the side of the longer generating line. Preferably, the rotation center C is located immediately above the center of the base of the generally cone shaped dispersion table 2a. In other words, the dispersion table 2a is rotatably driven by the rotating device 2b about a rotational center axis that passes through the center of the base of the generally cone shaped dispersion table 2a.

The supply troughs U1 to Un are located below the dispersion table 2a, and also arranged around the dispersion table 2a generally along the circumference thereof. Each pool hopper Vi shown in FIG. 1 is provided below the supply trough Ui, and each weighing hopper Xi is provided below the pool hopper Vi. Accordingly, the pool hoppers V1 to Vn and the weighing hoppers X1 to Xn are arranged below the dispersion table 2a generally along the circumference thereof.

As shown in FIG. 3(e), the transportation conveyor 100 is, for example, a bucket conveyor, and the chute 10 is provided below the transportation conveyor 100. The articles M are, for example, soft and highly adhesive articles such as poultry meat and the like. After the articles M are transferred to a position above the chute 10 by the transportation conveyor 100, the articles M are intermittently fed to the chute 10 located below from each bucket and the articles M drop onto the dispersion table 2a through the chute 10.

As shown in FIGS. 3(e) to 3(h), the rotating device 2b rotatably drives the dispersion table 2a to rotate around a generally vertical rotating shaft L (rotational center axis) at a constant rotation speed and in a continuous manner. As shown by the arrows in FIGS. 3(e) to 3(h), the articles M drop onto the rotation center C (FIG. 3(a)) of the dispersion table 2a or a position in the vicinity of the rotation center C, by passing through the chute 10. The articles M spirally slide down the inclined surface of the dispersion table 2a due to the centrifugal force generated by rotation of the dispersion table 2a and gravity, and the articles M are supplied to corresponding ones of the supply troughs U1 to Un.

Note that each supply trough Ui intermittently performs a reciprocating motion in a supply direction of the articles M, thereby supplying the articles M to the pool hopper Vi. The reciprocating motions of the supply troughs U1 to Un are achieved by, for example, converting rotation of a motor to reciprocating motion.

Supplying Operation of the Articles M

Next, the supplying operation of the articles M from the dispersion table 2a to the supply troughs U1 to Un is described. As described above, the transportation conveyor 100 intermittently transports the articles M to a position above the dispersion table 2a. Described below is an example where the articles M are supplied to the dispersion table 2a once each time the dispersion table 2a rotates 90 degrees.

As shown in FIGS. 3(a) to 3(d), the dispersion table 2a rotates about the rotation center C. The articles M fed from the transportation conveyor 100 to the chute 10 shown in FIG. 3(e) drop onto the rotation center C of the dispersion table 2a or a position in the vicinity of the rotation center C. The articles M that dropped onto the rotation center C of the dispersion table 2a or a position in the vicinity of the rotation center C spirally slide down in a direction opposite to the apex P of the generally cone shaped dispersion table 2a and along the inclined surface of the dispersion table 2a. In other words, the articles M drop onto the inclined surface 2f on the side of the longer generating line. Subsequently the articles M slide down along the inclined surface 2f, and as shown by the arrow in FIG. 3(a), the articles M are supplied to the plurality of supply troughs Ui shown on the right side of FIG. 3(a).

Subsequently, the articles M are supplied onto the dispersion table 2a each time the dispersion table 2a rotates 90 degrees, and as shown in FIGS. 3(b) to 3(d), the articles M are supplied to the plurality of supply troughs Ui at different positions approximately 90 degrees apart along the rotation direction of the dispersion table 2a.

For example, as shown in FIGS. 3(a) to 3(d), when the dispersion table 2a rotates in a clockwise direction, the articles M are supplied to the supply troughs Ui in the following order: right side (see FIG. 3(a)), lower side (see FIG. 3(b)), left side (see FIG. 3(c)), and upper side (see FIG. 3(d)).

In this way, the directions in which the articles M slide down are dispersed by rotation of the inclined surface of the dispersion table 2a whose apex is offset from the rotation center C. Therefore, even if the drop position of the articles M is deviated from the rotation center C, the articles M drop onto the inclined surface 2f on the side of the longer generating line. Further, the articles M slide down along the inclined surface 2f on the side of the longer generating line, and this inclined surface 2f on the side of the longer generating line rotates with rotation of the dispersion table 2a, enabling appropriate dispersion of the articles M.

Incidentally, for example, when the articles M are relatively large and soft articles such as poultry meat and the like, the articles M might get caught at the apex P and residues of the articles M might remain there, if the apex P of the dispersion table 2a were not offset from the rotation center C (i.e., when the dispersion table 2a has a shape of a right circular cone). With the present combination weighing apparatus 1, the apex P of the dispersion table 2a is located at a position offset from the rotation center C of the dispersion table 2a. Consequently, even if the drop position of the articles M dropped from the chute 10 is deviated from the center of the dispersion table 2a, the articles M will always drop onto the inclined surface 2f on the side of the longer generating line. Accordingly, the articles M are prevented from getting caught at the apex P and thus the articles M are prevented from leaving the residues.

Alternative Embodiment (1) To provide easy understanding, in the above described embodiment, the articles M are supplied to the dispersion table 2a once each time the dispersion table 2a rotates 90 degrees. However, an interval of supplying of the articles M to the dispersion table 2a may be set at a different interval.

For example, the supply of the articles M once for every 90-degree rotation as described above is achieved by allowing the articles M to be supplied four times during one rotation of the dispersion table 2a. However, by setting the number of times in which the articles M are supplied during one rotation of the dispersion table 2a to be a number other than an integer number, the drop position of the articles M into the supply troughs U1 to Un can be changed each time the dispersion table 2a rotates.

Figure 4:
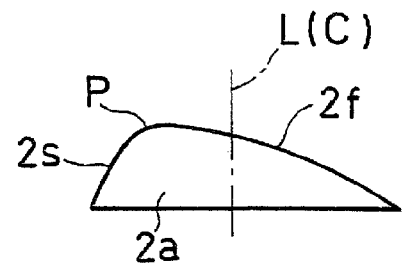
FIG. 4 includes a plurality of diagrams (a) to (d) illustrating schematic lateral views of dispersion tables according to alternative embodiments of the present invention.
Figure 4:
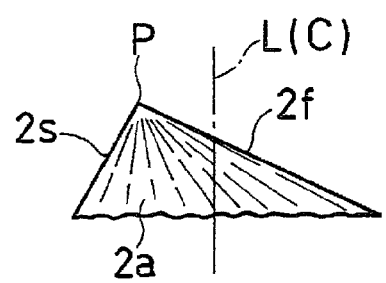
Figure 4:
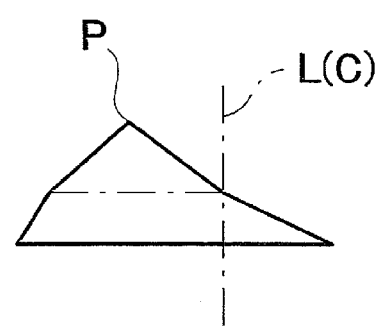
Figure 4:
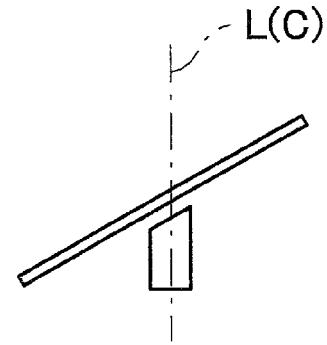

(2) The dispersion table 2a of the above described embodiment is appropriate as long as being formed in a generally oblique cone shape with its apex P being offset from the rotation center C. For example, as shown in FIG. 4(a), the generally oblique cone shaped dispersion table 2a may be formed in a smooth rounded oblique cone shape. Alternatively, as shown in FIG. 4(b), the surface of the generally oblique cone shaped dispersion table 2a may be formed in a corrugated shape. Additionally, a plurality of projections may be formed on the surface of the dispersion table 2a.

Note that, typically, the inclined surface 2f on the side of the longer generating line has a gentler inclination than the inclined surface 2s on the side of the shorter generating line.

(3) As shown in FIG. 4(c), the dispersion table 2a may have a generally oblique cone shape formed by combining a member on top of another member, the former member having a generally cone shape, and the latter member being a bottom portion of a generally oblique cone shape cut into two along a horizontal plane. In this way, the dispersion table 2a may have a generally oblique cone shape formed by arbitrarily combining a cone shaped member and a part of an oblique cone shaped member, with its apex P being offset from the rotation center C.

(4) The control unit 20 may configured to adjust the rotation pattern of the dispersion table 2a by controlling the rotating device 2b (rotary drive unit). With the present alternative embodiment, the control unit 20 receives information on a condition in which the articles M are dispersed to the plurality of supply troughs U1 to Un, and based on this information, the control unit 20 is configured to change a rotation pattern of the dispersion table 2a. For example, the control unit 20 is configured to adjust the rotation speed of the dispersion table 2a so that the articles M are preferentially supplied to a supply trough with a scarce supply of the articles M among the plurality of supply troughs U1 to Un. With the combination weighing apparatus 1 according to the present alternative embodiment, because of the addition of this control described above, a state of a supply position of the articles M in the dispersion unit 2 changes during operation, and therefore a bias of directions in which the articles M slide down is controlled and the directions in which the articles M slide down are more evenly dispersed.

Note that in the present alternative embodiment, for example, the dispersion table 2a may have a flat and generally circular shape (a shape of a turntable); a flat and generally rectangular shape; or a generally cone shape. In these cases, it is preferable that the rotating shaft L of the dispersion table 2a is respectively as follows: a straight line that passes through the center of the generally circular shape and is perpendicular to a flat surface of the dispersion table 2a; a straight line that passes through the center of the generally rectangular shape and is perpendicular to a flat surface of the dispersion table 2a; and a straight line that passes through the center of the base of the generally cone shape and is perpendicular to the base.

(5) The dispersion table 2a may have a shape shown in FIG. 4(d). In other words, the dispersion table 2a may be configured so as to be attached to the rotating shaft L in an inclined state with respect to the horizontal direction and so as to rotate about this rotating shaft L. For example, this dispersion table 2a may have a generally flat and generally circular shape (a shape of a turntable) or a generally flat and generally rectangular shape that has a main surface inclined with respect to the horizontal direction as shown in FIG. 4(d); or a generally cone shape. In these cases, it is preferable that the rotating shaft L of the dispersion table 2a is respectively as follows: a straight line that passes through the approximate center of the generally circular shape and that intersects with a generally flat surface of the dispersion table 2a at an angle, or a straight line that passes through the approximate center of the generally rectangular shape and that intersects with a generally flat surface of the dispersion table 2a at an angle; and a straight line that passes through the approximate center of the base of the generally cone shape and that intersects with the base at an angle.

The present invention is applicable to a combination weighing apparatus configured to combine weight results of articles.

The invention claimed is:

1. A combination weighing apparatus comprising:
   a dispersion unit configured to circumferentially disperse articles that drop onto the dispersion unit from above;
   a plurality of weighing hoppers arranged generally circumferentially below the dispersion unit to weigh the articles discharged into the weighing hoppers;
   a combination unit configured to combine weight results obtained from the weighing hoppers,
   the dispersion unit including a generally oblique cone shaped dispersion table and a rotary drive unit configured to rotate the dispersion table about a rotational center axis with an apex of the dispersion table being offset from the rotation center axis.

2. A combination weighing apparatus comprising:
   a dispersion unit configured to circumferentially disperse articles that drop onto the dispersion unit from above, the dispersion unit including a dispersion table having a generally oblique cone shape and a rotary drive unit configured to rotate the dispersion table about a rotational center axis;
   a plurality of weighing hoppers arranged generally circumferentially below the dispersion unit to weigh the articles discharged into the weighing hoppers;
   a combination unit configured to combine weight results obtained from the weighing hoppers; and
   a control unit configured to control the rotary drive unit to change a rotation pattern of the dispersion table.

3. A combination weighing apparatus comprising:
   a dispersion unit configured to receive articles and to circumferentially disperse the articles;
   a plurality of weighing hoppers configured to receive the articles dispersed by the dispersion unit and to weigh the articles; and
   a combination unit configured to combine weight results obtained from the weighing hoppers so that a predetermined weight or a predetermined quantity of the articles is reached,
   the dispersion unit including a generally oblique cone shaped dispersion table and a rotary drive unit configured to rotate the dispersion table about a rotational center axis with an apex of the dispersion table being offset from the rotation center axis.

4. The combination weighing apparatus as recited in claim 1, wherein
   the dispersion unit is arranged such that the rotational center axis passes through a center portion of a base of the generally oblique cone shaped dispersion table.

5. The combination weighing apparatus as recited in claim 2, wherein
   the control unit is configured to control the rotary drive unit to adjust a rotation speed of the dispersion table based on a condition in which the articles are dispersed by the dispersion unit.

6. The combination weighing apparatus as recited in claim 3, wherein
   the dispersion unit is arranged such that the rotational center axis passes through a center portion of a base of the generally oblique cone shaped dispersion table.

7. The combination weighing apparatus as recited in claim 2, wherein
   the control unit is configured to control the rotary drive unit to change a rotation speed of the dispersion table while the dispersion table is being rotated.

* * * * *